United States Patent
Grossman et al.

(10) Patent No.: US 9,986,225 B2
(45) Date of Patent: May 29, 2018

(54) TECHNIQUES FOR CUT-AWAY STEREO CONTENT IN A STEREOSCOPIC DISPLAY

(71) Applicant: AUTODESK, Inc, San Rafael, CA (US)

(72) Inventors: Tovi Grossman, Toronto (CA); George Fitzmaurice, Toronto (CA); Natalia Bogdan, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days. days.

(21) Appl. No.: 14/622,766

(22) Filed: Feb. 13, 2015

(65) Prior Publication Data

US 2015/0235409 A1   Aug. 20, 2015

Related U.S. Application Data

(60) Provisional application No. 61/940,224, filed on Feb. 14, 2014.

(51) Int. Cl.
   *G06T 15/40*     (2011.01)
   *H04N 13/04*     (2006.01)
   (Continued)

(52) U.S. Cl.
   CPC ......... *H04N 13/0402* (2013.01); *G06F 3/048* (2013.01); *G06F 3/0481* (2013.01);
   (Continued)

(58) Field of Classification Search
   CPC ................. G09G 2340/10; G09G 5/14; G09G 2340/0464; G09G 2340/14; G09G 2354/00; G06K 9/00597; G06K 9/00355; G06F 3/0304; G06F 3/011; G06F 3/017; G06F 3/0481; G06F 3/013; G06F 3/048; G06F 3/04815; G06F 3/0483; G02B 27/0093; G02B 2027/0178; G02B 2027/0138; G02B 2027/014; G02B 27/017; G02B 2027/0187; G02B 2027/0118; H04N 13/0497; H04N 13/0033; H04N 13/0402;
   (Continued)

(56) References Cited

U.S. PATENT DOCUMENTS 5,808,620 A * 9/1998 Doi .......................... G06T 15/60
                                                    345/426
5,894,310 A * 4/1999 Arsenault ........... G06F 3/04845
                                                    345/419

(Continued)

*Primary Examiner* — Devona Faulk
*Assistant Examiner* — Charles L Beard
(74) *Attorney, Agent, or Firm* — Artegis Law Group, LLP

(57) ABSTRACT

A computer-implemented method for stereoscopically displaying content includes determining a first position of an object within in a region of display space proximate to a stereoscopic display device and calculating a second position of a virtual object in the region. The method further includes determining an occluded portion of the virtual object that is occluded the object when the virtual object is disposed at the second position and causing the display device to stereoscopically render for display one or more portions of the virtual object that do not include the occluded portion. One advantage of the disclosed method is that a viewer can perform direct touch operations with stereoscopically displayed (3D) content with reduced visual discomfort.

19 Claims, 8 Drawing Sheets

(51) Int. Cl.
    *G06F 3/048* (2013.01)
    *H04N 13/00* (2018.01)
    *G06F 3/0481* (2013.01)
    *G06F 3/0483* (2013.01)

(52) U.S. Cl.
    CPC ........ *G06F 3/0483* (2013.01); *G06F 3/04815* (2013.01); *H04N 13/0033* (2013.01); *H04N 13/0497* (2013.01)

(58) Field of Classification Search
    CPC ........ G06T 2219/2004; G06T 2215/16; G06T 15/40; G06T 19/006; G06T 2200/04
    See application file for complete search history.

(56) References Cited

U.S. PATENT DOCUMENTS

| | | | | |
|---|---|---|---|---|
| 5,949,432 | A * | 9/1999 | Gough | G06F 3/0481 345/629 |
| 5,999,187 | A * | 12/1999 | Dehmlow | G06T 19/003 345/420 |
| 6,072,489 | A * | 6/2000 | Gough | G06F 3/0481 715/803 |
| 6,163,318 | A * | 12/2000 | Fukuda | G06F 3/0481 715/803 |
| 6,215,503 | B1 * | 4/2001 | Snyder | G06T 15/40 345/629 |
| 6,392,662 | B1 * | 5/2002 | Bou | G06T 11/206 178/18.01 |
| 6,462,763 | B1 * | 10/2002 | Mostyn | G06F 3/04812 715/764 |
| 6,480,205 | B1 * | 11/2002 | Greene | G06T 15/405 345/631 |
| 6,515,675 | B1 * | 2/2003 | Bourdev | G06T 15/503 345/592 |
| 6,574,360 | B1 * | 6/2003 | Berdardini | G06T 15/40 345/419 |
| 6,664,990 | B1 * | 12/2003 | Bates | G06F 3/04812 715/711 |
| 7,142,600 | B1 * | 11/2006 | Schonfeld | H04N 19/51 375/240.16 |
| 8,018,579 | B1 * | 9/2011 | Krah | G01B 11/00 356/4.01 |
| 8,209,628 | B1 * | 6/2012 | Davidson | G06F 3/0487 715/790 |
| 8,602,888 | B2 * | 12/2013 | Kaneko | A63F 13/10 463/32 |
| 8,665,293 | B2 * | 3/2014 | Bou | G06T 11/60 345/418 |
| 8,791,962 | B2 * | 7/2014 | Noda | G06F 3/04812 345/419 |
| 8,826,187 | B2 * | 9/2014 | Willis | G06F 3/0488 715/859 |
| 8,836,768 | B1 * | 9/2014 | Rafii | G06F 3/017 345/420 |
| 8,847,965 | B2 * | 9/2014 | Chandak | G06F 17/5009 345/473 |
| 8,854,433 | B1 * | 10/2014 | Rafii | G06F 3/017 348/42 |
| 8,866,811 | B2 * | 10/2014 | Okuno | G06T 19/006 345/156 |
| 9,025,902 | B2 * | 5/2015 | Schutz | 382/254 |
| 9,052,804 | B1 * | 6/2015 | Starner | G06F 1/163 |
| 9,069,382 | B1 * | 6/2015 | Starner | G06F 3/038 |
| 9,213,422 | B2 * | 12/2015 | Ofstad | G06F 3/0346 |
| 9,214,044 | B2 * | 12/2015 | Clemo | G06T 19/006 |
| 9,298,256 | B1 * | 3/2016 | Starner | G06K 9/00671 |
| 9,317,746 | B2 * | 4/2016 | Shoemaker | G06F 3/017 |
| 9,372,552 | B2 * | 6/2016 | Hartmann | G06F 3/0416 |
| 9,417,692 | B2 * | 8/2016 | Lamb | G06F 1/163 |
| 9,437,038 | B1 * | 9/2016 | Costello | G06T 15/08 |
| 9,477,368 | B1 * | 10/2016 | Filip | G06F 17/30241 |
| 9,599,825 | B1 * | 3/2017 | Mullins | G02B 27/0179 |
| 9,633,471 | B2 * | 4/2017 | Koguchi | G06T 15/06 |
| 9,658,765 | B2 * | 5/2017 | Nishihara | G06F 3/04886 |
| 9,766,793 | B2 * | 9/2017 | Kudo | G06F 3/04845 |
| 2001/0043216 | A1 * | 11/2001 | Hoffman | G06T 15/40 345/473 |
| 2002/0029127 | A1 * | 3/2002 | Wakashiro | G01C 11/06 702/152 |
| 2002/0113752 | A1 * | 8/2002 | Sullivan | G02B 27/2278 345/6 |
| 2002/0136460 | A1 * | 9/2002 | Bottou | G06T 9/00 382/224 |
| 2003/0058241 | A1 * | 3/2003 | Hsu | G06T 15/60 345/426 |
| 2003/0098881 | A1 * | 5/2003 | Nolte | G06F 3/0481 715/764 |
| 2004/0237053 | A1 * | 11/2004 | Impas | G06F 3/0481 715/856 |
| 2005/0231532 | A1 * | 10/2005 | Suzuki | G06F 3/012 345/633 |
| 2006/0044327 | A1 * | 3/2006 | Okuno | G06F 3/0304 345/626 |
| 2006/0103645 | A1 * | 5/2006 | Jacobson | G06T 15/40 345/418 |
| 2006/0132460 | A1 * | 6/2006 | Kolmykov-Zotov | G06F 3/04812 345/173 |
| 2006/0244735 | A1 * | 11/2006 | Wilson | G06F 3/0488 345/173 |
| 2007/0279412 | A1 * | 12/2007 | Davidson | H04N 13/026 345/419 |
| 2007/0279415 | A1 * | 12/2007 | Sullivan | H04N 13/026 345/427 |
| 2008/0180440 | A1 * | 7/2008 | Stich | G06T 15/40 345/426 |
| 2008/0211832 | A1 * | 9/2008 | Kumon | B60K 35/00 345/641 |
| 2008/0278633 | A1 * | 11/2008 | Tsoupko-Sitnikov | H04N 5/144 348/699 |
| 2008/0284864 | A1 * | 11/2008 | Kotake | G06K 9/3216 348/222.1 |
| 2009/0115784 | A1 * | 5/2009 | Tomite | G06T 15/06 345/426 |
| 2009/0142041 | A1 * | 6/2009 | Nagasawa | H04N 13/0033 386/341 |
| 2009/0217211 | A1 * | 8/2009 | Hildreth | G06F 3/017 715/863 |
| 2009/0271738 | A1 * | 10/2009 | Glaser-Seidnitzer | G06F 3/0482 715/821 |
| 2010/0073368 | A1 * | 3/2010 | Kim | G06T 15/40 345/422 |
| 2010/0103249 | A1 * | 4/2010 | Lipton | H04N 13/0022 348/51 |
| 2010/0231583 | A1 * | 9/2010 | Furukawa | G01B 11/24 345/419 |
| 2010/0272417 | A1 * | 10/2010 | Nagasawa | H04N 13/0033 386/341 |
| 2010/0275238 | A1 * | 10/2010 | Nagasawa | H04N 13/0033 725/116 |
| 2010/0328227 | A1 * | 12/2010 | Matejka | G06F 3/0488 345/173 |
| 2011/0032252 | A1 * | 2/2011 | Ohta | G09G 3/003 345/419 |
| 2011/0221866 | A1 * | 9/2011 | Ohta | G06F 1/1637 348/46 |
| 2011/0229020 | A1 * | 9/2011 | Yoshii | G06K 9/6282 382/159 |
| 2011/0249026 | A1 * | 10/2011 | Singh | G09G 3/003 345/630 |
| 2011/0254859 | A1 * | 10/2011 | Matsuda | G06F 3/13 345/633 |
| 2011/0267264 | A1 * | 11/2011 | McCarthy | G06F 3/017 345/157 |
| 2011/0291988 | A1 * | 12/2011 | Bamji | G06F 3/0428 345/175 |
| 2012/0030630 | A1 * | 2/2012 | Grossman | G06F 3/04815 715/850 |

(56) References Cited

U.S. PATENT DOCUMENTS

| | | | |
|---|---|---|---|
| 2012/0108328 A1* | 5/2012 | Konno | H04N 13/0497 463/31 |
| 2012/0117514 A1* | 5/2012 | Kim | G06F 3/011 715/849 |
| 2012/0176410 A1* | 7/2012 | Meier | G06F 3/011 345/633 |
| 2012/0206452 A1* | 8/2012 | Geisner | G02B 27/017 345/419 |
| 2012/0229445 A1* | 9/2012 | Jenkins | G06T 15/40 345/418 |
| 2012/0235904 A1* | 9/2012 | Plagemann | G06F 3/011 345/158 |
| 2012/0262486 A1* | 10/2012 | Raghoebardajal | G06F 3/011 345/633 |
| 2013/0050069 A1* | 2/2013 | Ota | G06F 3/011 345/156 |
| 2013/0076872 A1* | 3/2013 | Wang | H04N 13/0022 348/51 |
| 2013/0077882 A1* | 3/2013 | Venkataraman | G06T 9/00 382/233 |
| 2013/0093767 A1* | 4/2013 | Booth, Jr. | G06T 15/005 345/419 |
| 2013/0113892 A1* | 5/2013 | Nakamaru | G03B 35/18 348/47 |
| 2013/0135288 A1* | 5/2013 | King | G06F 3/04812 345/419 |
| 2013/0135309 A1* | 5/2013 | King | G06T 15/60 345/426 |
| 2013/0141434 A1* | 6/2013 | Sugden | G02B 27/017 345/426 |
| 2013/0162634 A1* | 6/2013 | Baik | G06T 15/00 345/419 |
| 2013/0194259 A1* | 8/2013 | Bennett | G06T 19/006 345/420 |
| 2013/0212506 A1* | 8/2013 | Aoshima | G06F 3/04845 715/765 |
| 2013/0215148 A1* | 8/2013 | Antonyuk | G06T 19/006 345/633 |
| 2013/0215230 A1* | 8/2013 | Miesnieks | G06T 19/006 348/46 |
| 2013/0265227 A1* | 10/2013 | Julian | G06F 3/04812 345/157 |
| 2013/0283213 A1* | 10/2013 | Guendelman | G06F 3/017 715/848 |
| 2013/0342572 A1* | 12/2013 | Poulos | G02B 27/017 345/633 |
| 2014/0035942 A1* | 2/2014 | Yun | G09G 5/006 345/592 |
| 2014/0043331 A1* | 2/2014 | Makinen | G06T 15/40 345/424 |
| 2014/0063061 A1* | 3/2014 | Reitan | G09G 3/003 345/633 |
| 2014/0085342 A1* | 3/2014 | Shoemaker | G06K 9/00355 345/672 |
| 2014/0129990 A1* | 5/2014 | Xin | G06F 3/017 715/849 |
| 2014/0184644 A1* | 7/2014 | Sharma | G06F 3/017 345/633 |
| 2014/0192164 A1* | 7/2014 | Tenn | H04N 13/0242 348/47 |
| 2014/0195988 A1* | 7/2014 | Kramer | G06F 3/017 715/863 |
| 2014/0306891 A1* | 10/2014 | Latta | G06F 3/017 345/158 |
| 2015/0009278 A1* | 1/2015 | Modai | H04N 7/15 348/14.08 |
| 2015/0084991 A1* | 3/2015 | Schutz | G06T 5/50 345/647 |
| 2015/0085076 A1* | 3/2015 | Lockhart | H04N 13/0468 348/46 |
| 2015/0091903 A1* | 4/2015 | Costello | G06T 15/20 345/426 |
| 2015/0130713 A1* | 5/2015 | Mikuni | H04N 13/004 345/157 |
| 2015/0169156 A1* | 6/2015 | Van Der Westhuizen | G06F 3/011 715/762 |
| 2015/0185873 A1* | 7/2015 | Ofstad | G06F 3/0346 345/158 |
| 2015/0199093 A1* | 7/2015 | Kuscher | G06F 3/0486 715/788 |
| 2015/0213640 A1* | 7/2015 | Neill | G06T 7/0075 345/427 |
| 2015/0221132 A1* | 8/2015 | Kruglick | G06T 19/006 345/633 |
| 2015/0235407 A1* | 8/2015 | Schutz | G06T 13/80 345/589 |
| 2015/0277700 A1* | 10/2015 | He | G06F 3/0325 715/852 |
| 2015/0279103 A1* | 10/2015 | Naegle | G06T 19/006 345/633 |
| 2015/0309694 A1* | 10/2015 | Nagao | G06F 3/04812 715/740 |
| 2015/0317814 A1* | 11/2015 | Johnston | G06F 17/24 358/1.18 |
| 2015/0348314 A1* | 12/2015 | Koguchi | G06T 15/06 345/420 |
| 2016/0098579 A1* | 4/2016 | Ballard | G02B 27/017 726/27 |
| 2016/0125642 A1* | 5/2016 | Zhu | G06T 15/60 345/421 |
| 2016/0139692 A1* | 5/2016 | Glazer | G09G 5/008 345/163 |
| 2016/0188175 A1* | 6/2016 | Dawari | G06F 3/04842 715/765 |
| 2016/0210783 A1* | 7/2016 | Tomlin | G06T 19/006 |
| 2016/0240011 A1* | 8/2016 | Fedosov | G06T 19/006 |
| 2016/0260261 A1* | 9/2016 | Hsu | G06T 19/006 |
| 2016/0291731 A1* | 10/2016 | Liu | G06F 1/1656 |
| 2016/0313813 A1* | 10/2016 | Neisler | G06F 3/03543 |
| 2016/0378294 A1* | 12/2016 | Wright | G06F 3/04815 715/851 |
| 2016/0378295 A1* | 12/2016 | Cousins | G06F 3/04812 715/702 |
| 2017/0032576 A1* | 2/2017 | Mazoyer | G08G 5/0021 |
| 2017/0084043 A1* | 3/2017 | Khandelwal | G06T 7/20 |
| 2017/0123492 A1* | 5/2017 | Marggraff | G06F 3/0304 |
| 2017/0161939 A1* | 6/2017 | Sugden | G06T 15/60 |
| 2017/0171538 A1* | 6/2017 | Bell | H04N 13/0497 |

* cited by examiner

TECHNIQUES FOR CUT-AWAY STEREO CONTENT IN A STEREOSCOPIC DISPLAY

CROSS-REFERENCE TO RELATED APPLICATIONS

This application claims benefit of the U.S. Provisional Patent Application having Ser. No. 61/940,224 and filed on Feb. 14, 2014. The subject matter of this related application is hereby incorporated herein by reference.

BACKGROUND OF THE INVENTION

Field of the Invention

The present invention relates generally to stereoscopic displays and, more specifically, to cut-away stereo content in a stereoscopic display.

Description of the Related Art

Digitally displayed technology has advanced to the point where content can be readily displayed stereoscopically to the viewer. Such display technology exists not only for large-scale projection systems, as in movie theaters, but also for computer and television displays as well. Stereoscopic display technology, used in conjunction with suitably configured stereoscopic viewing eyeglasses, allows a viewer to view content on a computer or television in what appears to be three dimensions (3D), either for an enhanced viewing experience or to better facilitate viewer interaction with an application that presents content in 3D.

Direct touch interaction with 3D content can greatly facilitate some operations, particularly in 3D modeling. For example, in a stereoscopic display region, hand gestures may be more effective than 2D cursor-based commands for manipulating 3D content that presented to appear in the display region. Selection of objects (e.g., by pinching), gross positioning of objects in three dimensions (e.g., by pinching and dragging), and rotation of objects (e.g., by swiping) can all be performed more quickly and ergonomically than by employing cursor-based or keyboard-based commands.

In some situations, though, direct touch interaction with stereoscopically displayed content, such as software widgets or other tools, can be problematic. For example, whenever a physical object, such as a user's hand, occludes displayed 3D content that is rendered to appear in front of the physical object, discrepancies in depth cues can occur. Stereoscopic display relies on the depth cues referred to as "convergence" and "accommodation" to inform a user's depth perception, so that the apparent location of the occluded 3D content appears closer to the user than the physical object appears to the user. Therefore, the occluded 3D content should appear to occlude the physical object. However, the physical object is still visible to the user, even though the displayed content, based on convergence and accommodation cues, should block the line of sight between the user and the physical object. This contradictory visual information breaks the illusion created by stereoscopic display. Worse, significant visual discomfort may result, including double vision, headache, and even nausea.

As the foregoing illustrates, there is a need for ways to display content stereoscopically that maintain proper 3D illusions created through stereoscopic display and do not cause visual discomfort during direct touch interactions.

SUMMARY OF THE INVENTION

One embodiment of the present invention sets forth a computer-implemented method for stereoscopically displaying content. The method includes determining a first position of an object within in a region of display space proximate to a stereoscopic display device and calculating a second position of a virtual object in the region. The method further includes determining an occluded portion of the virtual object that is occluded by the object when the virtual object is disposed at the second position and causing the display device to stereoscopically render for display one or more portions of the virtual object that do not include the occluded portion.

One advantage of the disclosed embodiment is that a viewer can perform direct touch operations with stereoscopically displayed (3D) content with reduced visual discomfort.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

As used herein, the term "3D content" refers to visual matter, such as images and video content, that are presented stereoscopically to a viewer, i.e., via dual two-dimensional images, each image being presented to a different eye of the viewer. Thus, "3D content" generally includes images having simulated depth, and does not refer to images displayed in three full dimensions, such as that generated by a holographic display or volumetric display. Similarly, the terms "3D display," "3D projection," and the like, as used herein, refer to stereoscopic display and stereoscopic projection techniques that simulate a three dimensional visual experience for a viewer, and do not generally imply full three-dimensional image generation.

Figure 1:
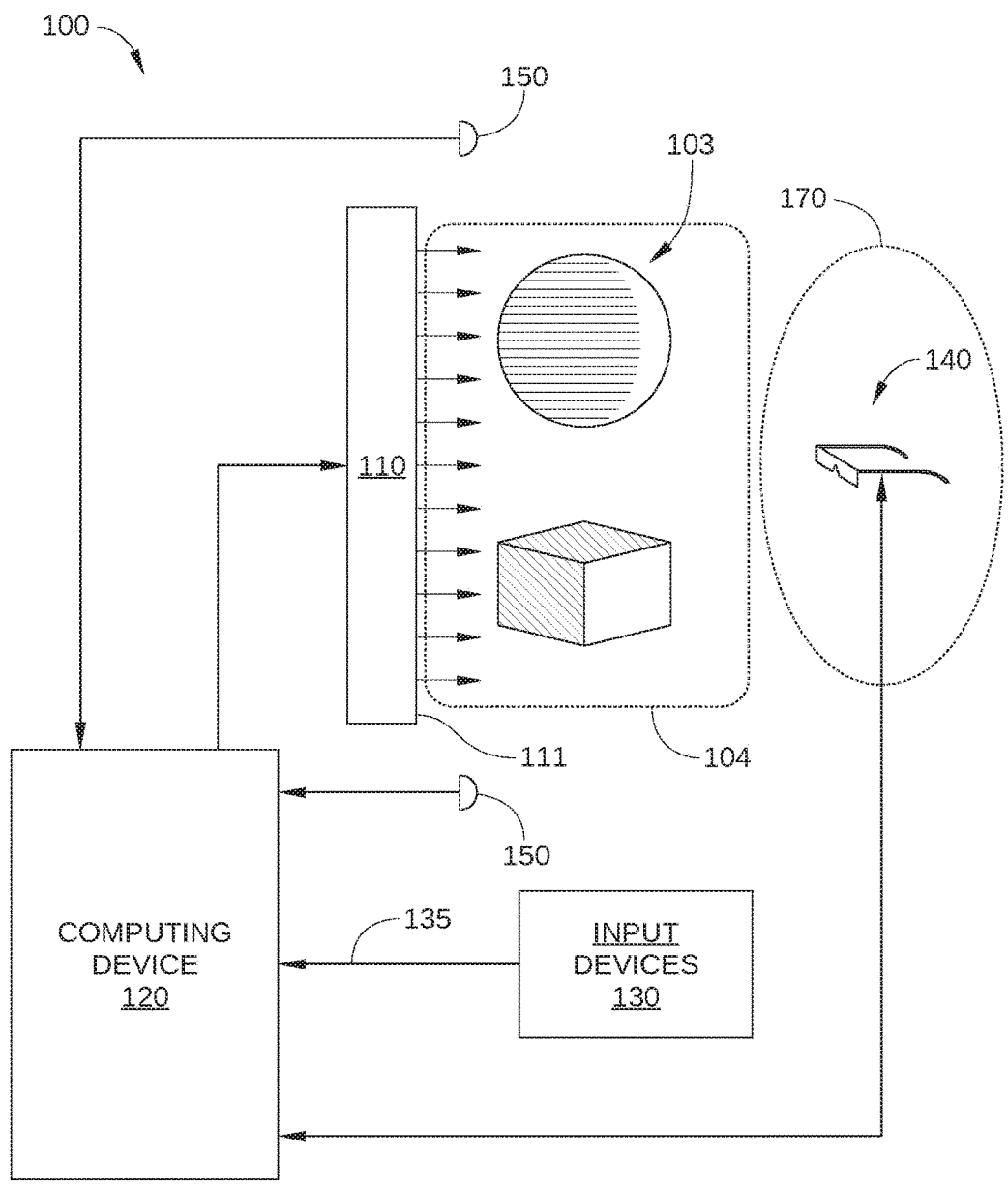
FIG. 1 schematically illustrates a stereoscopic display system configured to implement one or more aspects of the present invention.

FIG. 1 schematically illustrates a stereoscopic display system 100 configured to implement one or more aspects of the present invention. Stereoscopic display system 100 may be a commercial or home 3D (stereoscopic) projection system, an arcade or home video system, a 3D (stereoscopic) television, a computer-aided design system, a computer work station, or any other device or system suitable for practicing one or more embodiments of the present invention. Stereoscopic display system 100 includes a display device 110, a computing device 120, input devices 130, stereo viewing glasses 140 positioned in a viewing region 170 of display device 110, and one or more tracking sensors 150. It is noted that stereoscopic display system 100 described herein is illustrative and that any other technically feasible configurations thereof fall within the scope of the present invention. For example, one or more of the above components may be combined into a single apparatus, omitted, or duplicated. Alternately, stereoscopic display system 100 may be configured as an autostereoscopic, glasses-free system.

Generally, stereoscopic display system 100 is configured to selectively display 2D content and 3D content 103 to a viewer, such as graphical images and/or videos. Stereoscopic display system 100 displays 2D content 103 by rendering 2D content on a surface 111 of display device 110. Stereoscopic display system 100 stereoscopically displays 3D content 103 by rendering 3D content 103 on surface 111, so that 3D content 103 appears to the viewer to occupy a three-dimensional region of a display space 104 that is disposed proximate surface 111.

Display device 110 may be any technically feasible video display device, screen, projector and projection surface system, or monitor capable of conveying depth perception to a viewer via stereoscopy, i.e., by presenting two offset images separately to the left and right eye of the viewer. For example, in some embodiments, display device 110 is a computer monitor configured to present a first image output of particular subject matter to a viewer's left eye and a second image output of the subject matter to the viewer's right eye. Because the viewpoint used to generate the first image output is offset from the viewpoint used to generate the second image output, the viewer experiences simulated depth of field via stereoscopy. Generally, stereoscopy is effected in stereoscopic display system 100 by the viewer wearing stereo viewing glasses 140, which are configured to prevent the first image output from reaching the viewer's right eye and the second image output from reaching the viewer's left eye.

Suitable technologies that may be implemented in display device 110 to enable stereoscopic viewing include active polarization shutter systems (e.g., liquid crystal shutter glasses), passive polarization systems, where each lens allows light of one polarization and blocks light of orthogonal polarization, and interference filter systems, which use specific wavelengths of red, green, and blue for the right eye, and different wavelengths of red, green, and blue for the left eye. Other suitable technologies that may be implemented in display device 110 include ChromaDepth systems, color anaglyph systems, and the like.

Computing device 120 is configured to control operation of stereoscopic display system 100, including receiving commands and/or data from input devices 130 and transmitting data to display device 110. Computing device 120 may be or include a desktop computer, laptop computer, smart phone, personal digital assistant (PDA), video game console, set top console, tablet computer, digital video recorder, digital video disk player, or any other type of computing device suitable for controlling stereoscopic display system 100 to display graphical images and/or videos to a viewer and is suitable for practicing one or more embodiments of the present invention. In some embodiments, computing device 120 may be configured to generate some or all 2D content 102 or 3D content 103 displayed by stereoscopic display system 100. For example, computing device 120 may be configured to run a 3D modeling application or a video game. An embodiment of computing device 120 is described below in conjunction with FIG. 2.

Input devices 130 may include devices capable of providing input to computing device 120, such as a keyboard, a mouse, a touchscreen, a television remote control, a video game console, and the like. Input devices 130 may communicate with computing device 120 via a wired or wireless connection 135, such as Bluetooth or infrared signals. In some embodiments, input devices 130 may include a connection to any technically feasible type of communications or information network that allows data to be exchanged between computing device 120 and input devices 130, such as a wide area network (WAN), a local area network (LAN), a wireless (WiFi) network, and/or the Internet, among others.

Stereo viewing glasses 140 may be any stereo viewing glasses compatible with the technology implemented in display device 110, including active polarization shutter systems, passive polarization systems, interference filter systems, color anaglyph systems, ChromaDepth systems, and the like. Generally, stereo viewing glasses 140 are configured to prevent a first image output from reaching the viewer's right eye and a second image output from reaching the viewer's left eye, where the viewpoint used to generate the first image output is offset from the viewpoint used to generate the second image output.

Tracking sensors 150 may include any devices configured to detect the presence and motion of physical objects within display space 104 and to transmit location information associated with such physical objects to computing device 120. For example, in some embodiments, tracking sensors 150 may include two or more digital cameras configured to capture images of physical objects within display space 104. Additionally, a visible or invisible laser grid may be used to facilitate establishing depth or all three dimensions.

Figure 2:
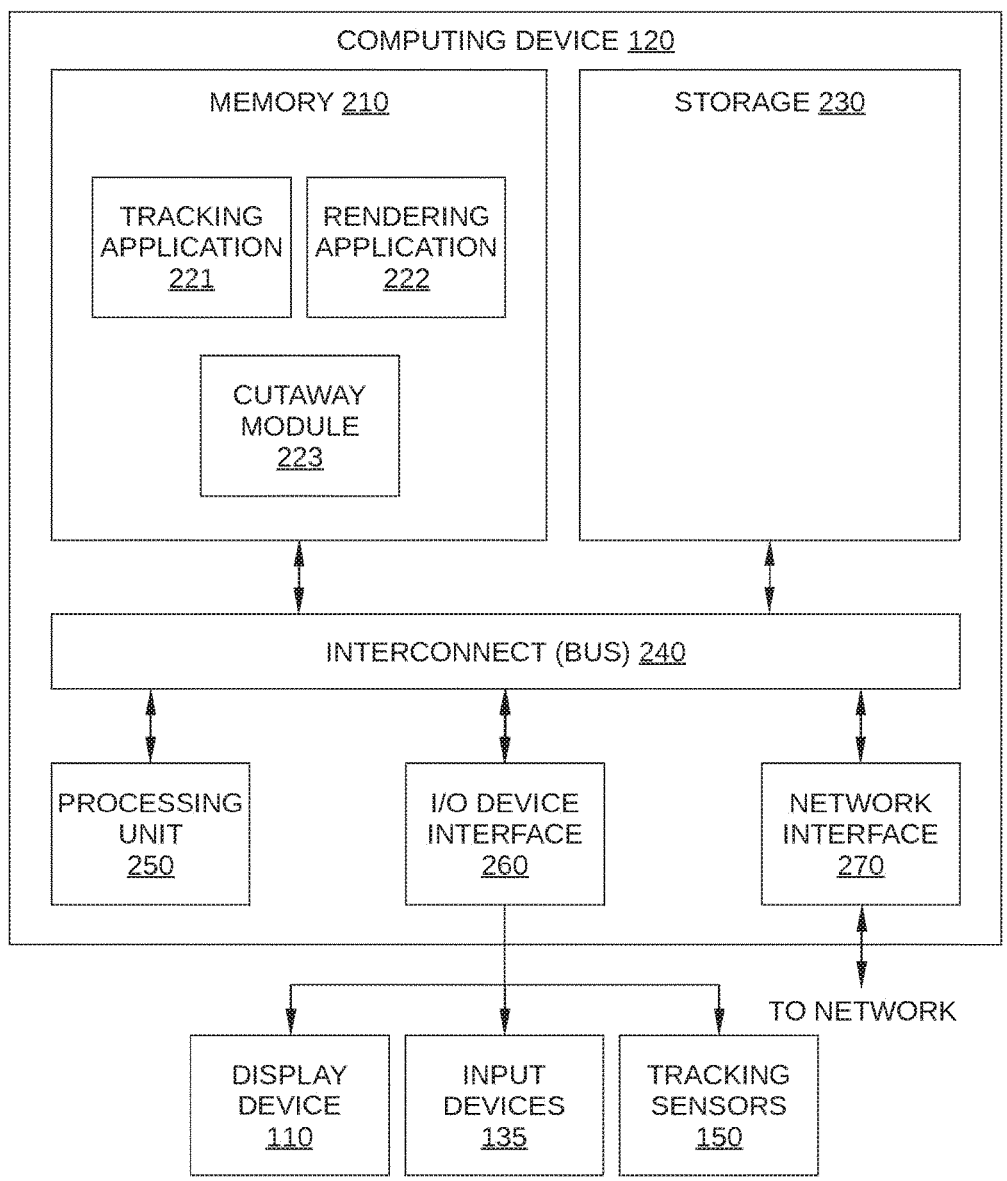
FIG. 2 is a more detailed illustration of the computing device of FIG. 1, according to one embodiment of the present invention.

FIG. 2 is a more detailed illustration of computing device 120, according to one embodiment of the present invention. Computing device 120 is configured to run a tracking application 221, a rendering application 222, and a cutaway module 223, which all reside in a memory 210. Computing device 120 is further configured to cause display device 110 to stereoscopically display graphical images and/or videos to a viewer. It is noted that the computing device described herein is illustrative and that any other technically feasible configurations fall within the scope of the present invention.

As shown, computing device 120 includes an interconnect (bus) 240 that connects a processing unit 250, an input/output (I/O) device interface 260 (coupled to display device 110, input devices 130, and tracking sensors 150 of FIG. 1), a memory 210, a storage 230, and a network interface 270.

Processing unit 250 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 250 may be any technically feasible hardware unit capable of processing data and/or executing software applications to facilitate operation of stereoscopic display system 100, including tracking application 221, rendering application 222, and cutaway module 223. Further, in the context of this disclosure, the computing elements shown in computing device 120 may correspond to a physical computing system (e.g., a system in a data center) or may be a virtual computing instance executing within a computing cloud.

Memory 210 is configured to store any software programs, operating system, drivers, and the like, that can be executed by processor 250 and facilitate operation of stereoscopic display system 100, including tracking application 221, rendering application 222, and cutaway module 223. Memory 210 may include a random access memory (RAM) module, a flash memory unit, or any other type of memory unit or combination thereof. Processing unit 250, I/O device interface 260, and network interface 270 are configured to read data from and write data to memory 210.

Tracking application 221 may include any technically feasible software application configured to receive and analyze digital images and/or digital videos, via tracking sensors 150. In some embodiments, tracking application 221 may be configured to track a viewer's hand while wearing tracking markers or other visual markers. In other embodiments, tracking application 221 may be configured to distinguish individual viewer body parts, such as hands and fingers, based partially or entirely on analysis of image data received from tracking sensors 150. Rendering application 222 may be any computer application or playback engine configured to stereoscopically render digital images, video, or any other 3D content to an end-user on display device 110. For example, in some embodiments, rendering application 222 may include a 3D modeling program or video game.

Cutaway module 223 is configured to determine if, from the viewpoint of a viewer, a physical object occludes 3D content generated by display device 110. Cutaway module 223 is also configured to determine what portion of such 3D content is the occluded portion, and this information is transmitted to rendering program 222, so that the occluded portion of 3D content is not rendered and is "cut away" from the 3D content generated by rendering application 222. In some embodiments, cutaway module 223 is a stand-alone application run by processor 250. In other embodiments, cutaway module 223 is a module of rendering application 222. In yet other embodiments, cutaway module 223 may be implemented at the processor level or at the operating system level, and in such embodiments can be used in conjunction with any software configured to generate 3D content, e.g., rendering application 222.

Storage 230 may be any technically feasible persistent storage device, such as a disk drive storage device, a solid-state storage device, or a combination of both. Although shown as a single unit, storage 230 may be a combination of fixed and/or removable storage devices, such as fixed disc drives, removable memory cards, or optical storage, network attached storage (NAS), or a storage area-network (SAN).

Figure 3:
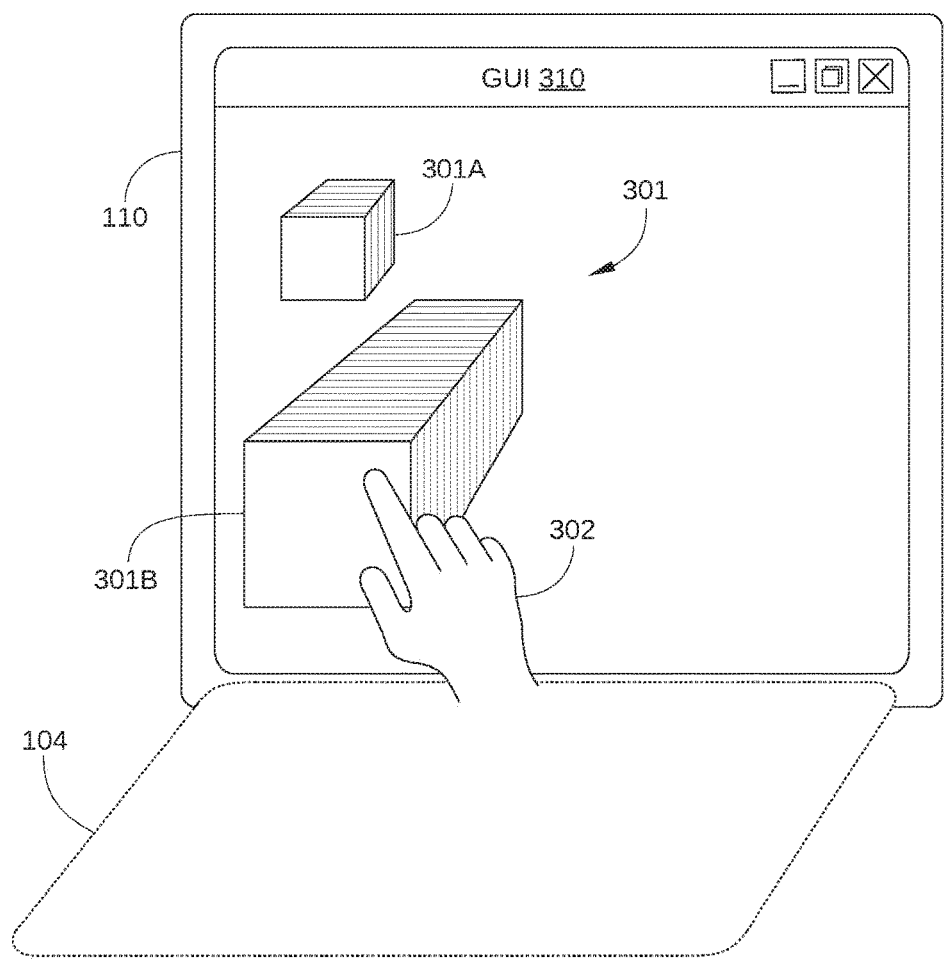
FIG. 3 schematically illustrates a stereoscopic view of 3D content and a physical object that is visible to a viewer even though purportedly occluded by the 3D content.

FIG. 3 schematically illustrates a stereoscopic view of 3D content 301 and a physical object 302 that is visible to a viewer even though purportedly occluded by 3D content 301. 3D content 301 is rendered on a graphical user interface (GUI) window 310 of an application configured to stereoscopically display visual content, where GUI window 310 is displayed on display device 110. Alternatively, 3D content may be displayed on display device 110 without GUI window 310. It is noted that 3D content 301 schematically illustrates content that appears to project out of GUI window 310 due to each eye of the viewer actually seeing a slightly different image. In practice, the two slightly different images seen by the viewer are rendered together on a display surface of display device 100, while the viewer perceives the location of 3D content 301 to be in display space 104. Display space 104 is a region of real space disposed proximate GUI window 310 and/or the surface of the display device. For clarity, in FIG. 3 display space 104 is indicated as a planar region proximate GUI window 310, but is actually the roughly cubic volume of space bounded by the planar region in FIG. 3 and GUI window 310.

In FIG. 3, 3D content 301 includes a cube 301A located near GUI window 310 and a rectangular rod 301B extending farther from GUI window 310 than cube 301A. Physical object 302 may include any real object within display space 104, such as a viewer's hand or a desktop object that happens to extend into display space 104. Physical object 302 is disposed proximate GUI window 310, and therefore is within display space 104. In FIG. 3, physical object 302 is depicted as a viewer's hand, such as when the viewer performs a direct touch interaction with 3D content 301 (e.g., such as selecting cube 301A).

In attempting to "touch" cube 301A with physical object 302, the viewer extends physical object 302 behind the perceived location of rectangular rod 301B. In so doing, from the viewpoint of the viewer, some or all of physical object 302 is then occluded by rectangular rod 301B. However, rectangular rod 301B is not a physical object that can block the line of sight between the viewpoint of the viewer and physical object 302. In reality rectangular rod 301B is a virtual object perceived by a viewer at a simulated position based on two slightly different images of the virtual object that are both located on the plane of GUI window 310. Because rectangular rod 301B is a virtual image constrained to the coordinates of GUI window 310, physical object 302 occludes rectangular rod 301B, even though convergence and accommodation cues indicate that rectangular rod 301B is closer to the viewer than physical object 302. Consequently, the viewer simultaneously conflicting depth perception cues: rectangular rod 301B (based on convergence and accommodation cues) appears at one distance but is colocated with physical object 302 (based on convergence, accommodation, and occlusion cues) which is at a greater distance. When experienced by a viewer of a stereoscopic display, this contradictory visual information can be very uncomfortable and/or visually fatiguing.

According to embodiments of the invention, direct touch interaction of 3D content can be performed on stereoscopically displayed content without such visual discomfort. When a physical object is detected in a projection space and occlusion of the 3D content by a physical object is determined, the 3D content is stereoscopically displayed in a modified form, i.e., with a "cut away." Specifically, the occluded portion of the 3D content is not rendered by the display device, thereby avoiding conflicting depth perception cues being presented to a viewer. One such embodiment is illustrated in FIG. 4.

Figure 4:
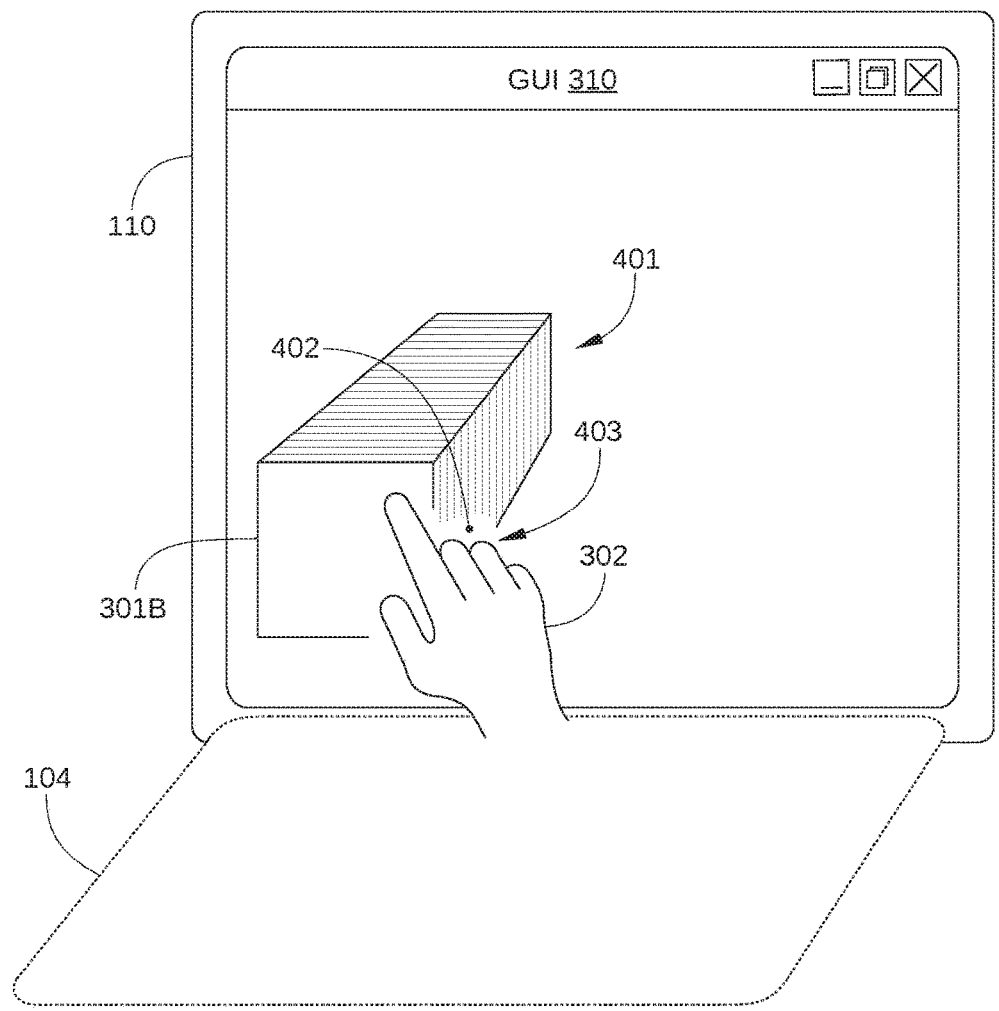
FIG. 4 schematically illustrates a stereoscopic view of a physical object and 3D content that is modified to visually accommodate the physical object, according to one embodiment of the present invention.

FIG. 4 schematically illustrates a stereoscopic view of a physical object 302 and 3D content 401 modified to visually accommodate physical object 302, according to one embodiment of the present invention. As shown, 3D content 401 is partially rendered on GUI window 310, so that an occluded portion 402 is not visible to a viewer. Thus, the viewer only perceives physical object 302 along a line of sight between the viewpoint of the viewer and physical object 302, and does not experience the conflicting visual cues of a portion of 3D content 401 simultaneously appearing to be located closer to the viewer than physical object 302 is to the viewer. Consequently, the presence of physical object 302 in projection space 302 does not cause visual discomfort to the viewer, and the viewer can comfortably perform direct touch interactions with 3D content 401.

Figure 5:
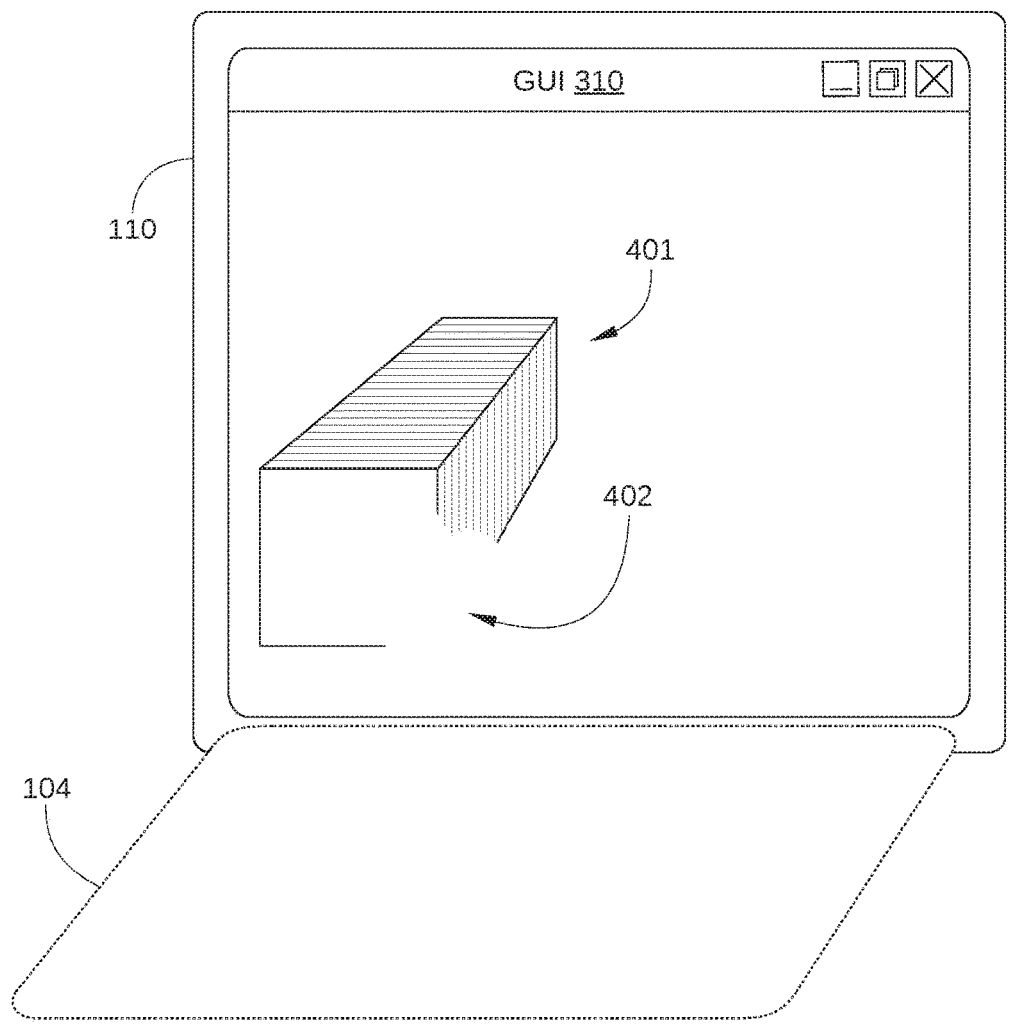
FIG. 5 schematically illustrates a stereoscopic view of 3D content that is modified with an occluding portion removed, according to one embodiment of the present invention.

FIG. 5 schematically illustrates a stereoscopic view of 3D content 401 modified with occluded portion 402 removed, according to one embodiment of the present invention. For clarity, physical object 302 in FIG. 4 is omitted in FIG. 5, and the location of occluded portion 402 is indicated. As shown, the portions of 3D content 401 being rendered on GUI window 310 do not include occluded portion 402. That is, the application associated with GUI window 310 (or a suitable display device) stereoscopically renders portions of 3D content 401, but does not render portions of 3D content 401 that include occluded portion 402. Consequently, occluded portion 402 is not visible to a viewer, and the viewer will therefore only perceive physical object 302 in the line of sight between physical object 302 and the viewpoint of the viewer. In some embodiments, to accurately calculate the configuration of occluding portion 402, the specific location of each eye of a viewer may be determined directly via input from tracking sensors 150 in FIG. 1. In other embodiments, the location of each eye of the viewer may be assumed by the application associated with GUI window 310.

In some embodiments, a portion of 3D content that is not rendered may be configured to appear to be larger than the outline of physical object 302 Thus, returning to FIG. 4, the outline of occluded portion 402, as viewed by the viewer, extends beyond the outline of physical object 302, thereby further reducing the possibility of conflicting visual cues between physical object 302 and 3D content 401. In such embodiments, the boundaries of occluded portion 402 do not need to be precisely determined for comfortable viewing of physical object 302 and 3D content 401. Therefore, exact knowledge of the location of each eye of a viewer is not needed. In addition, a buffer region 403 is visible to a viewer between physical object 302 and 3D content 401. In buffer region 403, there is no visible 3D content 401, thereby assuring that conflicting visual cues are not perceived by the viewer when physical object 302 is disposed behind the simulated location of 3D content 401.

In some situations, employing 2D user interface elements in conjunction with 3D content can also cause visual discomfort. Because 2D user interface elements, such as cursors, menu bars, or tool palettes, are generally rendered on a display device to appear on the surface of the display device, these elements are often occluded by 3D content that is also being displayed by the display device. Thus, as described above with physical objects in a projection space, occluded 2D user interface elements can result in visual discomfort and fatigue. According to embodiments of the invention, 2D user interface elements can be used in conjunction with 3D content without visual discomfort. When a 2D user interface element is determined to be occluded by 3D content, the 3D content is stereoscopically displayed in a modified form, i.e., with a cut away. Specifically, the occluding portion of the 3D content is not rendered by the display device, thereby avoiding conflicting depth perception cues being presented to a viewer. One such embodiment is illustrated in FIG. 6.

Figure 6:
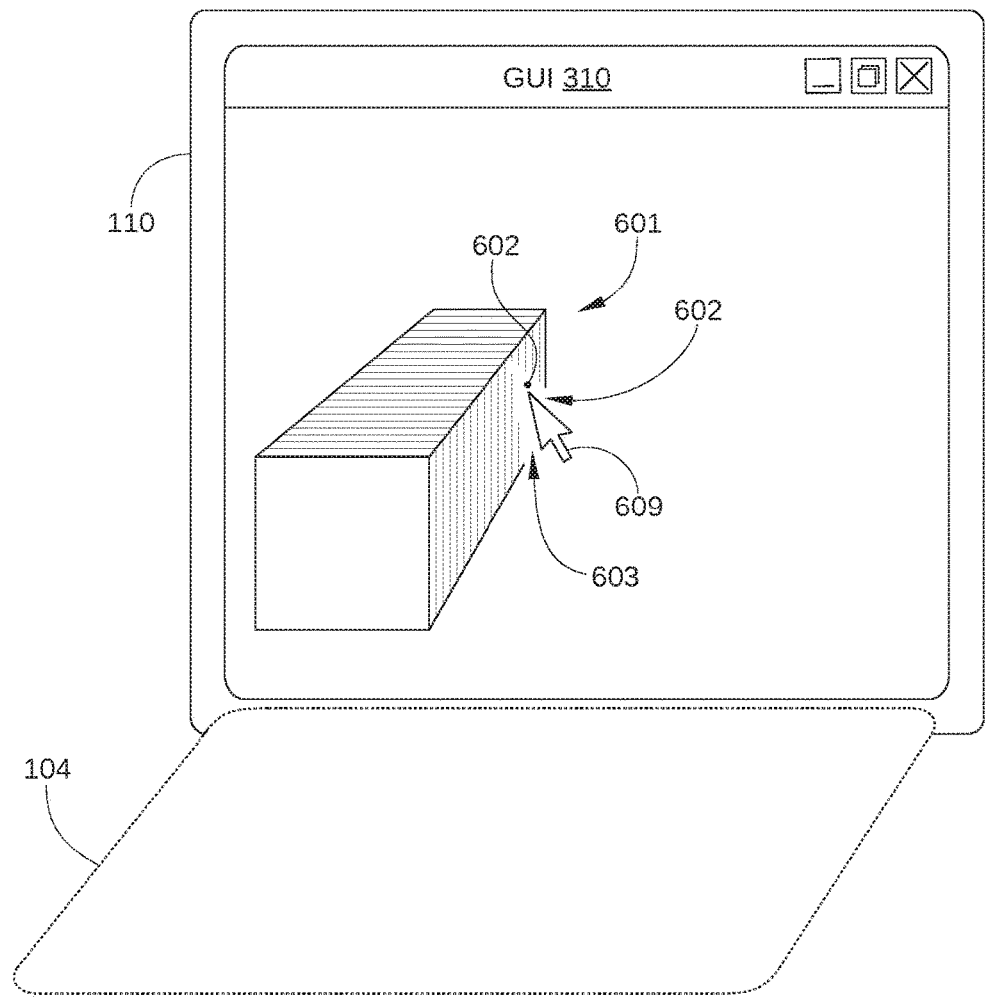
FIG. 6 schematically illustrates a stereoscopic view of a 2D cursor and 3D content that is modified with an occluding portion that corresponds to the 2D cursor, according to one embodiment of the invention.

FIG. 6 schematically illustrates a stereoscopic view of a 2D cursor 609 and 3D content 601 that is modified with an occluding portion 602 that corresponds to 2D cursor 609, according to one embodiment of the invention. As shown, the portions of 3D content 601 that are presented to the viewer do not include occluding portion 602, but the location of occluding portion 602, as it is rendered, is indicated. In some embodiments, occluding portion 602 is configured so that, from the viewpoint of the viewer, the edge of occluding portion 602 extends beyond the outline of 2D cursor 609 when occluding portion 602 is excluded from being rendered. Consequently, a buffer region 603 is visible to a viewer between 2D cursor 609 and 3D content 601. In other embodiments, occluding portion 602 may be configured to substantially conform to the outline of 2D cursor 609 as viewed by the viewer.

In some stereoscopic display applications, 3D user interface elements may be used to facilitate viewer input operations. For example, in 3D modeling applications, selecting values of certain parameters is often a three-dimensional problem. Therefore, a three-dimensional tool enables selection of such a parameter with a single visual element, instead of multiple sliders or other elements. For example, a two-dimensional surface may provide two dimensions and depth may provide the third dimension. Such visual tools using depth as a value selection mechanism will necessarily occlude a viewer's hand or finger whenever the tool is used, since the depth position of the user's hand defines one dimension of the parameters being selected. In some embodiments, the portion of such 3D visual tools that is not rendered for display to the viewer is based on a depth of the user's hand or finger, rather than on the perceived proximity of the 3D user interface element to the user's hand or finger. That is, the rendered portion of the 3D visual tool is truncated at a plane corresponding to the depth of the user's hand or finger. One such embodiment is illustrated in FIG. 7.

Figure 7:
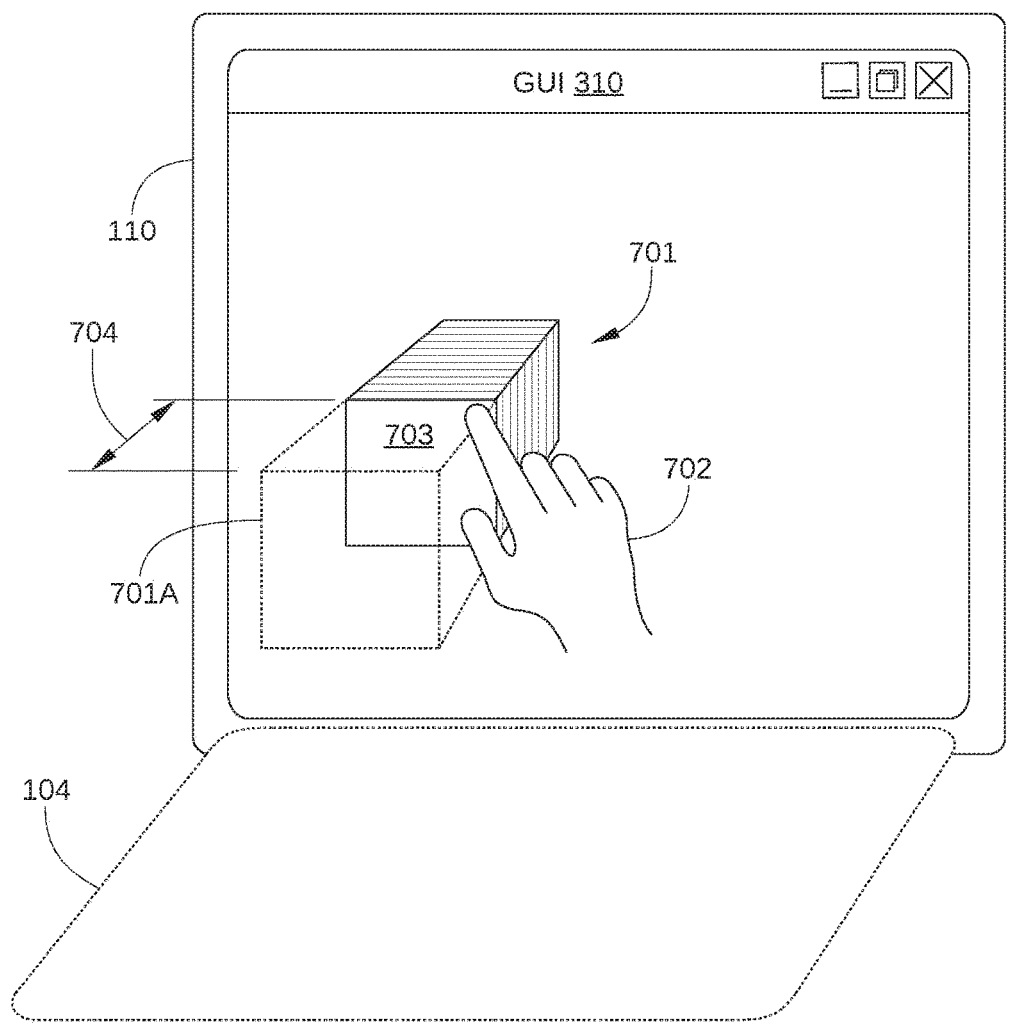
FIG. 7 schematically illustrates a stereoscopic view of a 3D visual tool rendered as 3D content and a user's hand interacting with the 3D visual tool, according to one embodiment of the invention.

FIG. 7 schematically illustrates a stereoscopic view of a 3D visual tool 701 rendered as 3D content and a user's hand 702, according to one embodiment of the invention. 3D visual tool 701 may be any 3D user interface element that includes perceived depth of a user's hand or finger as a selection scale for a particular value. For example, in the context of color selection, the two-dimensional surface 703 of 3D visual tool 701 may be a color palette of a plurality of different colors, for which depth selection corresponds to a color saturation value. As shown, 3D visual tool 701 appears to extend out of GUI window 310 horizontally, and user's hand 702 is positioned with a depth 704 into display space 104 partially along the length of 3D visual tool 701, indicating a particular value for the parameter associated with 3D visual tool 701. 3D visual tool 701 is truncated at a uniform depth 704, while the remaining portion of 3D visual tool 701 that would otherwise appear to extend farther away from GUI window 310 is not rendered, or cut away. For reference, an outline 701A of the remaining portion of 3D visual tool 701 is included in FIG. 7. In practice, outline 701A is generally not made visible to the viewer. Because 3D visual tool 701 is truncated along a vertical plane corresponding to the current depth of user's hand 702, all of two-dimensional surface 703 of 3D visual tool 701 is visible to the viewer, facilitating selection of any value that is available on two-dimensional surface 703. In some embodiments, truncating an element of a 3D model along a vertical plane corresponding to the current depth of user's hand 702 may be used to select a point or plane in the element.

Figure 8:
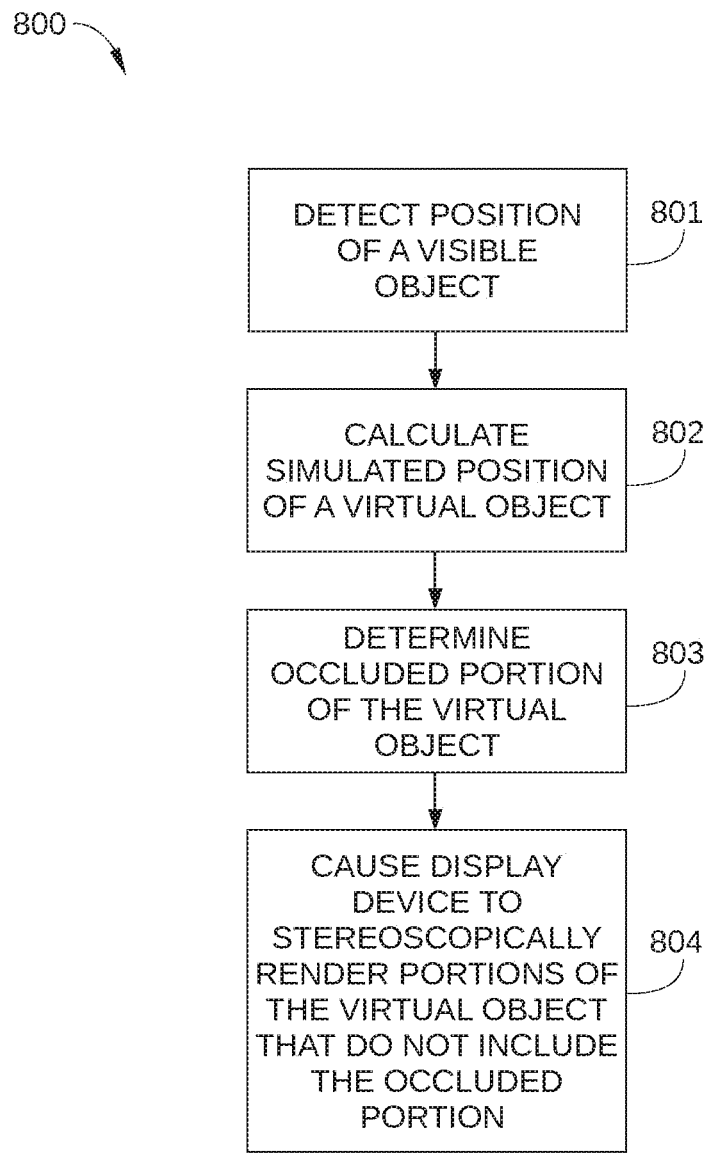
FIG. 8 is a flowchart of method steps for displaying stereoscopic content when a portion of the content appears to occlude a physical object, according to one embodiment of the present invention.

FIG. 8 is a flowchart of method steps for displaying stereoscopic content when a portion of the content appears to occlude a physical object, according to one embodiment of the present invention. Although the method steps are described in conjunction with the systems of FIG. 1-7, persons skilled in the art will understand that any system configured to perform the method steps, in any order, is within the scope of the present invention.

As shown, the method 800 begins at step 801, where tracking application 221 determines a physical position of a visible object. In some embodiments, tracking application 221 detects the position of the visible object via data received from tracking sensors 150, such as when the visible object is a physical object entering a projection space (a region of real space proximate a stereoscopic display device). For example, when a viewer moves a hand, finger, physical pointer device, or other object into the projection space of the display device, tracking application 221 can detect the position of the object. In other embodiments, the visible object may be a 2D user interface element displayed on the display device, such as a cursor, menu bar, tool palette, or the like. In such embodiments, tracking application 221 may detect the location of one or more 2D interface elements continuously. Alternatively, tracking application 221 may detect the location of 2D interface elements only when in motion, selected by a viewer, or otherwise in an active state.

In step 802, rendering application 222 calculates a simulated position of a virtual object in the projection space of the stereoscopic display device, the simulated position being the position in the projection space that the virtual object (i.e., 3D content), appears to occupy to the viewer.

In step 803, cutaway module 223 determines an occluded portion of the virtual object that occludes the visible object when the virtual object is disposed in the simulated position. The occluded portion is determined from the point of view of the viewer when viewing the visible object. In some embodiments, a particular viewpoint in or near the projection space is assumed for the viewpoint, i.e., eye location, of the viewer. In other embodiments, the eye location of the viewer can be explicitly determined, for example by tracking application 221, based on image data from tracking sensors, such as tracking sensors 150.

In some embodiments, the occluded portion of the virtual object includes the volumetric intersection of the virtual object and the visible object. In some embodiments, the occluded portion of the virtual object also includes some or all portions of the virtual object that are positioned between the volumetric intersection and the viewpoint of the viewer. Furthermore, in some embodiments, the occluded portion of the virtual object may include an extended occluded portion that extends beyond the outline of the above-described volumetric intersection. In such embodiments, the occluded portion of the virtual object may include portions of the virtual object that are proximate the volumetric intersection. Consequently, from the viewpoint of the viewer, when the virtual object is displayed with the cut away, (i.e., without the occluding portion), there is a buffer region adjacent to the visible object that is free of 3D content.

In step 804, rendering application 222 causes the display device to stereoscopically render portions of the virtual object that do not include the occluded portion. From the point of view of the viewer, no portion of the virtual object is occluded by the visible object, and therefore no conflicting visual cues are perceived by the viewer when interacting with the virtual object via the visible object.

By implementation of method 800, visual discomfort is avoided, even when a viewer moves a hand or object "behind" the perceived location of 3D content in the projection space. This is because a viewer does not perceive, along a particular line of sight, a portion of the visible object to be at one distance from the viewer and a portion the virtual object to be simultaneously at a different distance. Advantageously, a viewer can interact with 3D content using hand gestures, 2D graphical interface elements, or a combination of both without suffering from eye fatigue, headache, or nausea. Thus, one advantage of method 800 is that a viewer can perform direct touch operations with stereoscopically displayed content with reduced visual discomfort. An additional advantage is that the user can perform operations on 3D content using 2D user interface elements without visual discomfort, even though the 2D user interface elements may appear to be located behind the 3D content.

In sum, embodiments of the present invention provide systems and method for displaying stereoscopic content. When a physical object is detected in a projection space and occlusion of 3D content by the physical object is determined, the 3D content is stereoscopically displayed in a modified form, where the occluded portion of the 3D content is not rendered by the display device. One advantage of the disclosed embodiments is that a viewer can perform direct touch operations with stereoscopically displayed (3D) content with reduced visual discomfort.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for displaying stereoscopic content, the method comprising:
    determining a first position of an object within a region of display space proximate to a stereoscopic display device;
    determining a buffer zone that substantially surrounds the object;
    calculating a second position of a virtual object in the region;
    determining an occluded portion of the virtual object that is occluded by the object and the buffer zone when the virtual object is disposed at the second position; and
    causing the display device to stereoscopically render for display a first portion of the virtual object without rendering the occluded portion, wherein the first portion of the virtual object does not render a second portion of the virtual object that extends beyond the occluded portion, in order to reduce conflicting visual cues between the object and the virtual object.

2. The method of claim 1, wherein the object comprises a physical object disposed within the region and between the second position and a particular viewpoint associated with a viewer disposed proximate to the region.

3. The method of claim 2, wherein the object comprises a physical object operable to interact with the virtual object.

4. The method of claim 3, wherein the virtual object comprises a 3D user interface element, and causing the display device to stereoscopically render for display the first portion of the virtual object comprises causing the display device to truncate the 3D user interface element at a depth corresponding to the first position.

5. The method of claim 1, wherein the virtual object comprises a 2D image rendered on the display device.

6. The method of claim 5, wherein the 2D image comprises a 2D user interface element.

7. The method of claim 6, wherein the 2D user interface element comprises one of a cursor, a menu bar, and a tool palette.

8. The method of claim 1, wherein causing the display device to stereoscopically render for display the first portion of the virtual object comprises causing the display device to render portions of the virtual object to appear three-dimensional to a viewer located at a particular viewpoint.

9. The method of claim 1, wherein determining an occluded portion of the virtual object comprises assuming a particular viewpoint associated with a viewer disposed proximate the region.

10. The method of claim 1, wherein the second portion of the virtual object that extends beyond the occluded portion includes a portion of the virtual object that is proximate to a volumetric intersection of the virtual object and the object.

11. A non-transitory computer readable medium storing instructions that, when executed by a processor, cause the processor to perform the steps of:
    determining a first position of a virtual cursor within a region of display space proximate to a stereoscopic display device;
    calculating a second position of a virtual object in the region;
    determining an occluded portion of the virtual object that is occluded by the virtual cursor when the virtual object is disposed at the second position; and
    causing the display device to stereoscopically render for display a first portion of the virtual object that do not include the occluded portion, wherein the first portion of the virtual object does not render a second portion of the virtual object that extends beyond the occluded portion, in order to reduce conflicting visual cues between the virtual cursor and the virtual object.

12. The non-transitory computer readable medium of claim 11, wherein the virtual cursor is disposed within the region between the display device and a particular viewpoint associated with a viewer disposed proximate to the region.

13. The non-transitory computer readable medium of claim 12, wherein the virtual cursor is operable to interact with the virtual object.

14. The non-transitory computer readable medium of claim 13, wherein the virtual object comprises a 3D user interface element, and causing the display device to stereoscopically render for display the first portion of the virtual object comprises causing the display device to truncate the 3D user interface element at a depth corresponding to the first position.

15. The non-transitory computer readable medium of claim 11, wherein the virtual object comprises a 2D image rendered on the display device.

16. The non-transitory computer readable medium of claim 15, wherein the 2D image comprises a 2D user interface element.

17. The non-transitory computer readable medium of claim 11, wherein causing the display device to render for display the first portion of the virtual object comprises causing the display device to render portions of the virtual object to appear three-dimensional to a viewer located proximate to the region.

18. The non-transitory computer readable medium of claim 11, wherein determining an occluded portion of the virtual object comprises assuming a particular viewpoint associated with a viewer disposed proximate the region.

19. A computing device comprising:
   a processor; and
   a memory that is coupled to the processor and includes instructions that, when executed, cause the processor to perform the steps of:
   determining a first position of an object within a region of display space proximate to a stereoscopic display device;
   calculating a second position of a virtual object in the region;
   determining a first portion of the virtual object that is farther away from the stereoscopic display device than the first position when the virtual object is disposed at the second position; and
   causing the stereoscopic display device to stereoscopically render for display a first portion of the virtual object that do not include the first portion, wherein rendering the first portion of the virtual object does not render a second portion of the virtual object that extends beyond an occluded portion of the virtual object that is occluded by the object, in order to reduce conflicting visual cues between the object and the virtual object; and
   causing the stereoscopic display device to render an outline of the first portion of the virtual object.

* * * * *